United States Patent
Ando

(10) Patent No.: US 10,286,557 B2
(45) Date of Patent: May 14, 2019

(54) WORKPIECE POSITION/POSTURE CALCULATION SYSTEM AND HANDLING SYSTEM

(71) Applicant: FANUC CORPORATION, Yamanashi (JP)

(72) Inventor: Toshiyuki Ando, Yamanashi (JP)

(73) Assignee: FANUC CORPORATION (JP)

( * ) Notice: Subject to any disclaimer, the term of this patent is extended or adjusted under 35 U.S.C. 154(b) by 0 days.

(21) Appl. No.: 15/363,205

(22) Filed: Nov. 29, 2016

(65) Prior Publication Data
US 2017/0151672 A1    Jun. 1, 2017

(30) Foreign Application Priority Data

Nov. 30, 2015   (JP) .................................. 2015-232991

(51) Int. Cl.
*B25J 9/00*       (2006.01)
*B25J 9/16*       (2006.01)
*G06T 7/73*       (2017.01)

(52) U.S. Cl.
CPC ............... *B25J 9/1697* (2013.01); *G06T 7/75* (2017.01); *G06T 2207/10028* (2013.01); *G06T 2207/30164* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 4,367,891 A | * | 1/1983 | Wauer | B25J 15/0009 269/266 |
| 4,921,293 A | * | 5/1990 | Ruoff | A61F 2/583 294/106 |
| 4,957,320 A | * | 9/1990 | Ulrich | B25J 9/102 192/56.1 |
| 4,980,626 A | * | 12/1990 | Hess | B25J 9/1005 250/559.33 |
| 5,108,140 A | * | 4/1992 | Bartholet | B25J 15/0009 294/106 |
| 5,172,951 A | * | 12/1992 | Jacobsen | A61F 2/588 294/104 |

(Continued)

FOREIGN PATENT DOCUMENTS

CN   1293752 A   5/2001
CN   102448679 A  5/2012

(Continued)

*Primary Examiner* — Jonathan L Sample
(74) *Attorney, Agent, or Firm* — RatnerPrestia

(57) ABSTRACT

A workpiece position/posture calculation system which is able to efficiently calculate a position and posture of a workpiece utilizing 3D matching. The workpiece position/posture calculation system includes a workpiece position/posture calculation part comparing measurement data including 3D position information of a workpiece obtained by a 3D measuring device against a 3D model of the workpiece to calculate the position and posture of the workpiece. Further, the workpiece position/posture calculation system further includes a measurement data excluding part excluding part of the measurement data to be used in subsequent calculation by the workpiece position/posture calculation part based on the calculated position and posture of the workpiece.

13 Claims, 9 Drawing Sheets

(56) References Cited

U.S. PATENT DOCUMENTS

| | | | | |
|---|---|---|---|---|
| 5,501,498 A * | 3/1996 | Ulrich | ............... | B25J 9/102 |
| | | | | 294/106 |
| 5,762,390 A * | 6/1998 | Gosselin | ............... | B25J 15/0009 |
| | | | | 294/106 |
| 5,967,580 A * | 10/1999 | Rosheim | ............... | B25J 3/04 |
| | | | | 294/106 |
| 6,517,132 B2 * | 2/2003 | Matsuda | ............... | B25J 15/0009 |
| | | | | 294/106 |
| 6,721,444 B1 * | 4/2004 | Gu | ............... | B25J 9/1697 |
| | | | | 345/419 |
| 6,817,641 B1 * | 11/2004 | Singleton, Jr. | ............... | B25J 9/102 |
| | | | | 294/106 |
| 7,168,748 B2 * | 1/2007 | Townsend | ............... | B25J 9/1612 |
| | | | | 294/106 |
| 7,203,573 B2 | 4/2007 | Ban et al. | | |
| 7,289,884 B1 * | 10/2007 | Takahashi | ............... | B25J 9/1612 |
| | | | | 700/245 |
| 7,340,100 B2 * | 3/2008 | Higaki | ............... | G06F 3/017 |
| | | | | 382/199 |
| 7,549,688 B2 * | 6/2009 | Hayakawa | ............... | B25J 9/0009 |
| | | | | 294/106 |
| 8,280,837 B2 * | 10/2012 | Platt | ............... | B25J 9/1612 |
| | | | | 294/110.1 |
| 8,297,672 B2 * | 10/2012 | Kim | ............... | B25J 9/104 |
| | | | | 294/106 |
| 8,346,393 B2 * | 1/2013 | Kim | ............... | B25J 9/1612 |
| | | | | 700/261 |
| 8,364,314 B2 * | 1/2013 | Abdallah | ............... | H01R 13/17 |
| | | | | 700/264 |
| 8,463,434 B2 * | 6/2013 | Takahashi | ............... | B25J 9/1612 |
| | | | | 318/568.16 |
| 8,483,882 B2 * | 7/2013 | Abdallah | ............... | H01R 13/17 |
| | | | | 700/245 |
| 8,504,198 B2 * | 8/2013 | Takahashi | ............... | B25J 9/1612 |
| | | | | 700/245 |
| 8,798,794 B2 | 8/2014 | Walser et al. | | |
| 8,929,608 B2 | 1/2015 | Takizawa | | |
| 9,026,234 B2 | 5/2015 | Suzuki | | |
| 9,102,055 B1 * | 8/2015 | Konolige | ............... | B25J 9/163 |
| 9,616,572 B2 | 4/2017 | Watanabe et al. | | |
| 9,621,856 B2 | 4/2017 | Yamamoto | | |
| 9,630,320 B1 * | 4/2017 | Konolige | ............... | B25J 9/163 |
| 9,927,222 B2 * | 3/2018 | Suzuki | ............... | G01B 11/002 |
| 2004/0028260 A1 * | 2/2004 | Higaki | ............... | G06F 3/017 |
| | | | | 382/118 |
| 2005/0107920 A1 | 5/2005 | Ban et al. | | |
| 2005/0125099 A1 * | 6/2005 | Mikami | ............... | G06N 3/008 |
| | | | | 700/245 |
| 2006/0012198 A1 * | 1/2006 | Hager | ............... | B25J 9/1612 |
| | | | | 294/106 |
| 2006/0128316 A1 * | 6/2006 | Moller | ............... | G09B 23/32 |
| | | | | 455/67.15 |
| 2006/0195226 A1 * | 8/2006 | Matsukawa | ............... | B25J 9/162 |
| | | | | 700/245 |
| 2007/0010913 A1 * | 1/2007 | Miyamoto | ............... | B25J 9/1658 |
| | | | | 700/264 |
| 2007/0018470 A1 * | 1/2007 | Hayakawa | ............... | B25J 9/0009 |
| | | | | 294/106 |
| 2007/0219668 A1 * | 9/2007 | Takahashi | ............... | B25J 9/1612 |
| | | | | 700/249 |
| 2007/0236162 A1 * | 10/2007 | Kawabuchi | ............... | B25J 9/102 |
| | | | | 318/568.16 |
| 2008/0077361 A1 * | 3/2008 | Boyd | ............... | B25J 9/1612 |
| | | | | 702/189 |
| 2008/0114491 A1 * | 5/2008 | Takahashi | ............... | B25J 9/1612 |
| | | | | 700/245 |
| 2008/0253612 A1 * | 10/2008 | Reyier | ............... | B25J 9/1697 |
| | | | | 382/103 |
| 2009/0069942 A1 * | 3/2009 | Takahashi | ............... | B25J 9/1633 |
| | | | | 700/260 |
| 2009/0302626 A1 * | 12/2009 | Dollar | ............... | B25J 9/104 |
| | | | | 294/106 |
| 2009/0306825 A1 * | 12/2009 | Li | ............... | B25J 9/1669 |
| | | | | 700/261 |
| 2010/0011899 A1 * | 1/2010 | Kim | ............... | B25J 9/104 |
| | | | | 74/490.04 |
| 2010/0138039 A1 * | 6/2010 | Moon | ............... | B25J 9/1612 |
| | | | | 700/245 |
| 2010/0161130 A1 * | 6/2010 | Kim | ............... | B25J 9/1612 |
| | | | | 700/261 |
| 2010/0179689 A1 * | 7/2010 | Lin | ............... | G05B 19/41865 |
| | | | | 700/250 |
| 2010/0280661 A1 * | 11/2010 | Abdallah | ............... | H01R 13/17 |
| | | | | 700/260 |
| 2010/0280663 A1 * | 11/2010 | Abdallah | ............... | H01R 13/17 |
| | | | | 700/264 |
| 2011/0067521 A1 * | 3/2011 | Linn | ............... | B25J 15/0009 |
| | | | | 74/490.06 |
| 2011/0206274 A1 * | 8/2011 | Tateno | ............... | G06T 7/75 |
| | | | | 382/154 |
| 2012/0059517 A1 * | 3/2012 | Nomura | ............... | B25J 9/1612 |
| | | | | 700/259 |
| 2012/0283875 A1 * | 11/2012 | Klumpp | ............... | B25J 9/1648 |
| | | | | 700/258 |
| 2012/0306876 A1 * | 12/2012 | Shotton | ............... | G06T 17/10 |
| | | | | 345/424 |
| 2013/0114861 A1 * | 5/2013 | Takizawa | ............... | G06T 7/74 |
| | | | | 382/106 |
| 2013/0114886 A1 | 5/2013 | Kotake et al. | | |
| 2016/0155235 A1 * | 6/2016 | Miyatani | ............... | G06K 9/036 |
| | | | | 382/103 |
| 2017/0098309 A1 * | 4/2017 | Michel | ............... | B25J 9/1692 |

FOREIGN PATENT DOCUMENTS

| | | |
|---|---|---|
| CN | 103085076 A | 5/2013 |
| CN | 103302666 A | 9/2013 |
| JP | 2004188562 A | 7/2004 |
| JP | 2012026895 A | 2/2012 |
| JP | 2012033119 A | 2/2012 |
| JP | 2012-125878 A | 7/2012 |
| JP | 2012-218119 A | 11/2012 |
| JP | 2012220271 A | 11/2012 |
| JP | 2013257182 A | 12/2013 |
| JP | 2015009314 A | 1/2015 |

* cited by examiner

WORKPIECE POSITION/POSTURE CALCULATION SYSTEM AND HANDLING SYSTEM

BACKGROUND ART

1. Field of the Invention

The present invention relates to a workpiece position/posture calculation system calculating a position and posture of a workpiece and a handling system including that workpiece position/posture calculation system.

2. Description of Related Art

Known in the art is 3D matching which compares 3D position information of an object against object models to identify an actual position of an object. 3D matching requires calculations using parameters of six degrees of freedom, so the load on the computer is large. To speed up the 3D matching, it is known to limit the search range (see Japanese Patent Publication No. 2012-218119A and Japanese Patent Publication No. 2012-125878A).

SUMMARY OF INVENTION

A technique is sought for efficiently calculating the position and posture of an object using 3D matching.

According to the present invention, there is provided a workpiece position/posture calculation system (6) for calculating a position and posture of a workpiece (5), the workpiece position/posture calculation system (6) including a 3D measuring device (4) measuring at least one workpiece (5) arranged in a 3D space and acquiring measurement data (60) including the 3D position information of the at least one workpiece (5), a 3D model storage part (61) storing a 3D model (5A) of the workpiece (5), a position/posture calculation data preparation part (62) preparing at least one set of position/posture calculation data (63) to be used when calculating the position and posture of the workpiece (5), a workpiece position/posture calculation part (64) using the individual position/posture calculation data (63) to compare the measurement data (60) against the 3D model (5A) to calculate the position and posture of the workpiece (5), and a measurement data excluding part (65) excluding part of the measurement data (60) to be used in subsequent calculation by the workpiece position/posture calculation part (64) based on the position and posture of the workpiece (5) calculated by the workpiece position/posture calculation part (64).

In a preferred embodiment, the position/posture calculation data (63) includes a priority degree, and the workpiece position/posture calculation part (64) is configured to successively use sets of position/posture calculation data (63) having high priority degrees to compare the measurement data (60) against the 3D model (5A) to calculate the position and posture of the workpiece (5).

In a preferred embodiment, the position/posture calculation data (63) includes a range of posture to be searched when comparing the measurement data (60) against the 3D model (5A).

In a preferred embodiment, the position/posture calculation data (63) includes a range of position to be searched when comparing the measurement data (60) against the 3D model (5A).

In a preferred embodiment, the position/posture calculation data (63) further includes information relating to measurement data (60) which should not be excluded by the measurement data excluding part (65).

In a preferred embodiment, the workpiece position/posture calculation part (64) is configured to calculate the position and posture of the workpiece (5) and calculate a score showing the credibility of the results of calculation, the position/posture calculation data (63) includes a score threshold value used when judging whether to exclude part of the measurement data (60) based on the position/posture of the workpiece (5) calculated by the workpiece position/posture calculation part (64), and the measurement data excluding part (65) is configured to exclude the part of the measurement data when the score exceeds the score threshold value.

In a preferred embodiment, the measurement data excluding part (65) is configured to use the position and posture of the workpiece (5) calculated by the workpiece position/posture calculation part (64) to convert the coordinates of the 3D model (5A) and exclude the measurement data (60) present near the 3D model converted in coordinates.

In a preferred embodiment, the position/posture calculation data preparation part (62) is configured to respond to manual input and prepare position/posture calculation data (63).

In a preferred embodiment, the position/posture calculation data (63) includes a probability of occurrence of the position and posture of the workpiece (5) estimated utilizing physical simulation.

In a preferred embodiment, the position/posture calculation data (63) includes a probability of occurrence of the position and posture of the workpiece (5) estimated based on statistical data.

In a preferred embodiment, the position/posture calculation data preparation part (62) is configured to prepare additional sets of position/posture calculation data (63) based on the previous results of calculation of the workpiece position/posture calculation part (64).

In a preferred embodiment, there is provided a handling system (10) handling a workpiece (5) by a robot (2), the handling system (10) including a robot (2) which is able to handle the workpiece (5) and a workpiece position/posture calculation system (6), wherein the handling system is configured so that the robot (2) handles the workpiece (5) based on the position and posture of the workpiece (5) calculated by the workpiece position/posture calculation system (6).

In a preferred embodiment, there is provided a handling system (10) including a robot (2) which is able to handle a workpiece (5) and a workpiece position/posture calculation system (6), which handling system (10) is configured so that the robot (2) handles the workpiece (5) based on the position and posture of the workpiece (5) calculated by the workpiece position/posture calculation system (6) and is configured so that the position/posture calculation data preparation part (62) prepares additional sets of position/posture calculation data based on the position and posture of at least one of the workpieces (5) other than the workpiece (5) handled by the robot (2) among the positions and postures of the workpieces (5) calculated by the workpiece position/posture calculation part (64).

BRIEF DESCRIPTION OF THE DRAWINGS

These and other objects, features, and advantages of the present invention will become clearer by referring to the detailed description relating to illustrative embodiments of the present invention shown in the attached drawings.

DETAILED DESCRIPTION

Below, embodiments of the present invention will be explained with reference to the attached drawings. The component elements of the illustrated embodiments are suitably changed in scale to assist in understanding the present invention. The same reference notations are used for the same or corresponding component elements.

Figure 1:
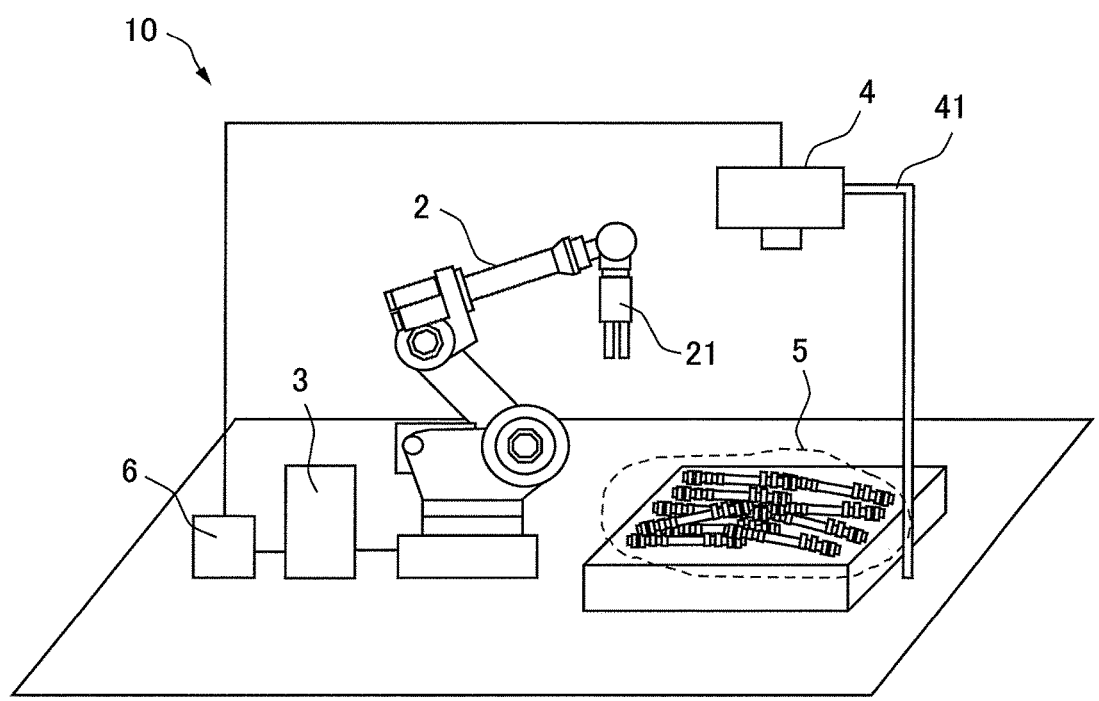
FIG. 1 is a view showing an example of the constitution of a handling system according to an embodiment.

FIG. 1 shows an example of the configuration of a handling system according to an embodiment. The handling system 10 includes a robot 2, robot controller 3, 3D measuring device 4, and workpiece position/posture calculation system 6.

The robot 2 has a plurality of joints driven by motors. For example, it is a six-axis vertical multi-articulated robot such as illustrated. The robot 2 is configured to be able to position a tip of an arm in any posture at any position in a range of operation determined in accordance with the dimensions and structure of the mechanical parts. The robot 2 is connected through a communication cable or other communicating means to the robot controller 3. The motors provided at the joints of the robot 2 are controlled by the robot controller 3.

The robot 2 includes a gripper 21 at a wrist of the tip of the arm. The gripper 21 is controlled by the robot controller 3 and operates to close and open so as to be able to grip and release a workpiece 5.

The robot controller 3 is a digital computer including a CPU, ROM, RAM, nonvolatile memory, input/output interface, etc.

The 3D measuring device 4 is fastened to a frame 41 above bulk stacked workpieces 5. The 3D measuring device 4 is set in a predetermined positional relationship with respect to the workpieces 5 so that the bulk stacked workpieces 5 are contained in the field of vision.

The 3D measuring device 4 detects the surfaces of the workpieces 5 and acquires 3D position information of a plurality of points positioned on the surfaces of the workpieces 5 (below, sometimes called the "measurement data"). The 3D measuring device 4 is connected through a communication cable or other communicating means to the workpiece position/posture calculation system 6. In another embodiment, the 3D measuring device 4 may be placed at the wrist of the robot 2.

The 3D measuring device 4 is any type of noncontact type detector. The 3D measuring device 4 for example may be a stereo type detector utilizing two cameras, may be a detector of a type scanning the surfaces of objects by laser slit light, may be a detector of a type using a projector etc. to project a pattern of light on objects, or may be a detector configured to calculate the flight time from reflection at the surfaces of the objects to return to the projector.

The workpiece position/posture calculation system 6 acquires measurement data of the plurality of workpieces 5 from the 3D measuring device 4 to calculate the positions and postures of the workpieces 5 (below, sometimes the "positions and postures" referred to as "positions/postures"). The workpiece position/posture calculation system 6 is a digital computer including a CPU, ROM, RAM, nonvolatile memory, input/output interface, etc.

The workpiece position/posture calculation system 6 is connected through a communication cable or other communicating means to the robot controller 3 and can send and receive data and signals with it. In FIG. 1, the workpiece position/posture calculation system 6 and robot controller 3 are shown separately, but the robot controller 3 may also have the function of the workpiece position/posture calculation system 6.

The handling system 10 controls the robot 2 and handles a workpiece 5 based on the position/posture of the workpiece 5 detected by the workpiece position/posture calculation system 6.

Figure 3:
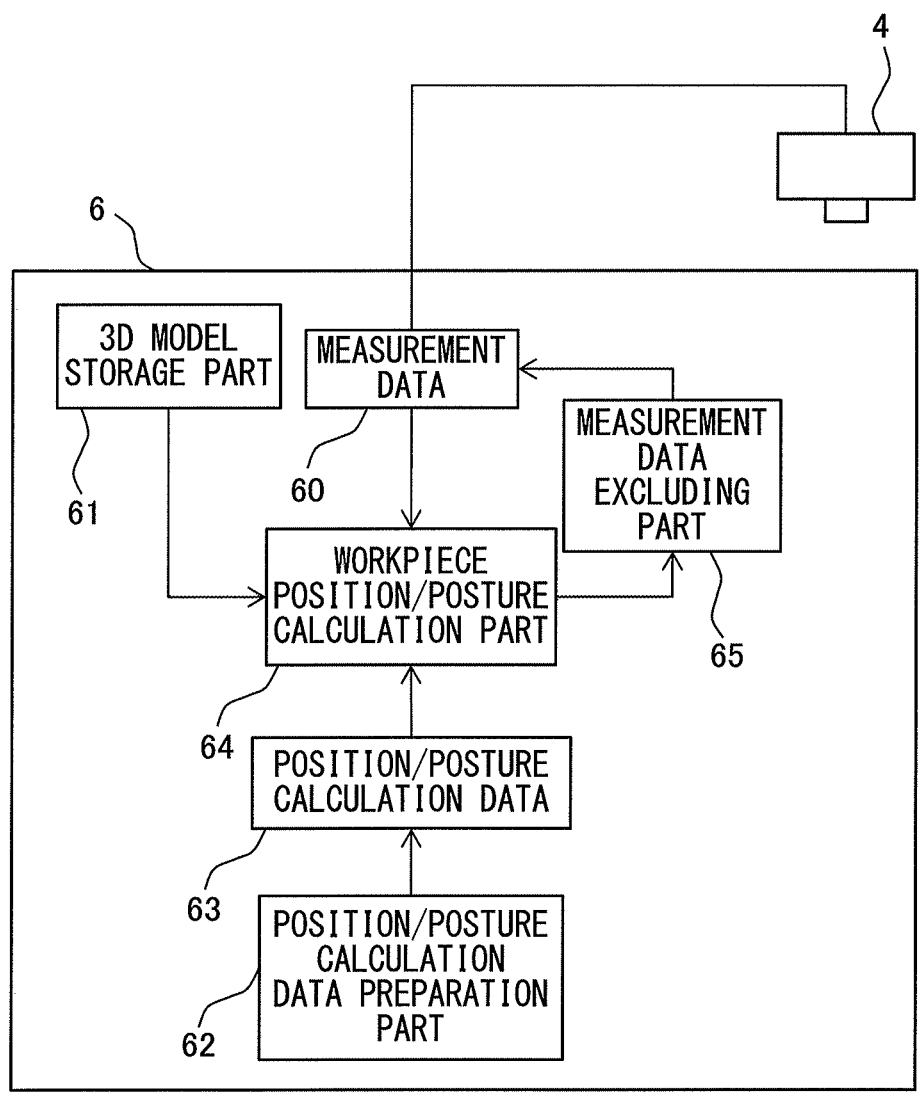
FIG. 3 is a functional block diagram of a workpiece position/posture calculation system.

The workpiece position/posture calculation system 6 calculates the position/posture of the workpiece 5 by comparing the measurement data of the workpiece 5 against a 3D model of the workpiece 5 (below, sometimes called "3D matching"). Referring to FIG. 3, the workpiece position/posture calculation system 6 includes a 3D model storage part 61, position/posture calculation data preparation part 62, workpiece position/posture calculation part 64, and measurement data excluding part 65.

The 3D model storage part 61 stores a 3D model of the workpiece 5. The 3D model of the workpiece 5 is prepared in advance based on CAD data of the workpiece 5 etc.

The position/posture calculation data preparation part 62 prepares a set of position/posture calculation data 63 used when calculating the position/posture of the workpiece 5. The position/posture calculation data 63 is a combination of the parameters required for calculating the position/posture of the workpiece 5. For example, the position/posture calculation data 63 includes a range of position and range of posture to be searched when performing 3D matching etc.

For example, when the position of the workpiece 5 is known, it is necessary to find only the posture of the workpiece 5, so only the range of posture is included in the position/posture calculation data. Conversely, when the posture of the workpiece 5 is known, the position/posture calculation data includes only the range of position to be searched.

As shown in FIG. 1, when workpieces 5 are bulk stacked, as the position/posture calculation data, ranges of three degrees of freedom for the range of position and for the range of posture, that is, a total of six degrees of freedom, are necessary.

In one embodiment, the position/posture calculation data 63 includes a plurality of types of at least one of the range of position and range of posture. The position/posture and range of posture are prepared so as to encompass the range of positions where a workpiece 5 may be arranged and the range of postures which a workpiece 5 can take. The range of position and range of posture, as explained later, are associated with the probabilities of occurrence of these positions/postures.

Figure 4:
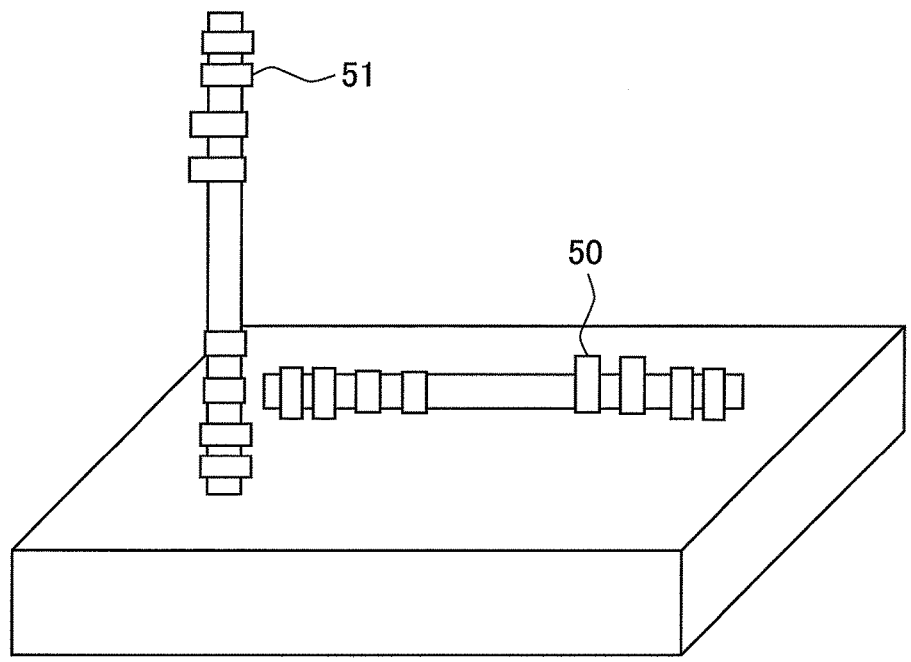
FIG. 4 is a view showing two workpieces differing in position/posture.

FIG. 4 shows two workpieces 50, 51 differing in position/posture. The longitudinal direction of one workpiece 50 is oriented in the horizontal direction, while the longitudinal direction of the other workpiece 51 is oriented in the vertical direction. In such a case, the probability of occurrence of a posture like the workpiece 50 is higher than the workpiece 51. Therefore, the range of posture corresponding to the workpiece 50 and the range of posture corresponding to the workpiece 51 form different sets of position/posture calculation data 63.

The position/posture calculation data 63 is stored associated with a priority degree. Specifically, the priority degree is associated with the individual sets of position/posture calculation data 63 so that the position/posture calculation data 63 including a range of position and range of posture with a high probability of occurrence becomes higher in priority degree.

The position/posture calculation data 63 may be manually prepared by the user based on the shape of the workpiece 5 or the past state of placement of the workpiece 5. Alternatively, it is possible to utilize physical simulation to reproduce the state of placement of the workpiece 5 in virtual space and find the probability of occurrence of a specific stacked state of a workpiece 5 from the statistical data obtained as a result.

The workpiece position/posture calculation part 64 uses the position/posture calculation data 63 to compare the measurement data 60 acquired by the 3D measuring device 4 against a 3D model of the workpiece 5 stored in the 3D model storage part 61 and to calculate the position/posture of the workpiece 5. The 3D matching for calculating the position/posture of the workpiece 5 is performed in accordance with the range of search included in the position/posture calculation data 63.

In one embodiment, the workpiece position/posture calculation part 64 may be configured to calculate the position/posture of the workpiece 5 by the following method. First, in accordance with at least one of the range of position and range of posture included in the position/posture calculation data 63, the 3D points forming the 3D model of the workpiece 5 are converted to coordinates and the difference between these 3D points and the 3D points of the measurement data 60 is calculated. If the difference is a predetermined threshold value or less, it is deemed that the 3D points of the measurement data and the 3D points of the 3D model match.

The workpiece position/posture calculation part 64 performs the above-mentioned 3D matching for all 3D points of the 3D model and, when the number of matches of the 3D points is a predetermined threshold value or more, outputs the position/posture of the 3D model as the position/posture of the workpiece 5.

In another embodiment, the workpiece position/posture calculation part 64 may also be configured to utilize the feature quantity of the 3D model to calculate the position/posture of the workpiece 5. The PPF (Point Pair Feature) feature quantity or SHOT (Signature of Histogram of Orientation) feature quantity of the 3D model etc. can be utilized. In this case, the feature quantities of the 3D models found in advance are compared against the 3D feature quantities of the measurement data to thereby calculate the position/posture of the workpiece 5.

The measurement data excluding part 65 excludes part of the measurement data 60 used in subsequent calculation of the position/posture of the workpiece 5 based on the position/posture of the workpiece 5 calculated by the workpiece position/posture calculation part 64.

The measurement data excluding part 65 places the 3D model at the position/posture of the workpiece 5 calculated by the workpiece position/posture calculation part 64 by converting the coordinates and excludes measurement data present near the 3D model.

Figure 5:
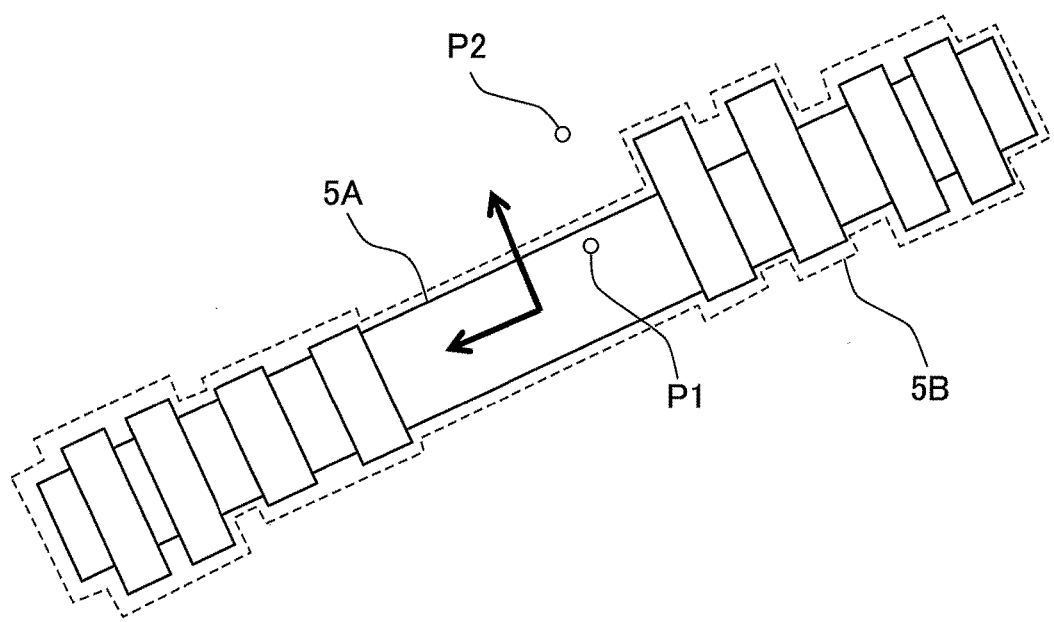
FIG. 5 is a view showing a 3D model of a workpiece and measurement data excluded based on the same.

FIG. 5 shows the 3D model of the workpiece 5 and the measurement data excluded based on the same. The arrows in FIG. 5 show the position/posture of the workpiece 5 calculated by the workpiece position/posture calculation part 64. The 3D model 5A is arranged so as to match the position/posture of the workpiece 5 of the calculated position/posture. The broken lines 5B around the 3D model 5A show the range where the measurement data 60 should be excluded. In the case of FIG. 5, the 3D point P1 is positioned inside the range surrounded by the broken lines 5B, so is excluded from the measurement data 60. On the other hand, the other 3D point P2 is positioned outside of the range surrounded by the broken lines 5B, so is not excluded from the measurement data 60.

However, depending upon the calculated position/posture of the workpiece 5, sometimes the measurement data 60 should not be excluded. That is, if the measurement data 60 is unsuitably excluded, when trying to calculate the position/posture of the workpiece 5 at the next step, an actually present workpiece 5 is liable to be unable to be recognized any longer. Therefore, it is also possible to enable designation of a range where the measurement data 60 is not excluded. The range where the measurement data 60 should not be excluded may be included in the position/posture calculation data 63.

Figure 6:
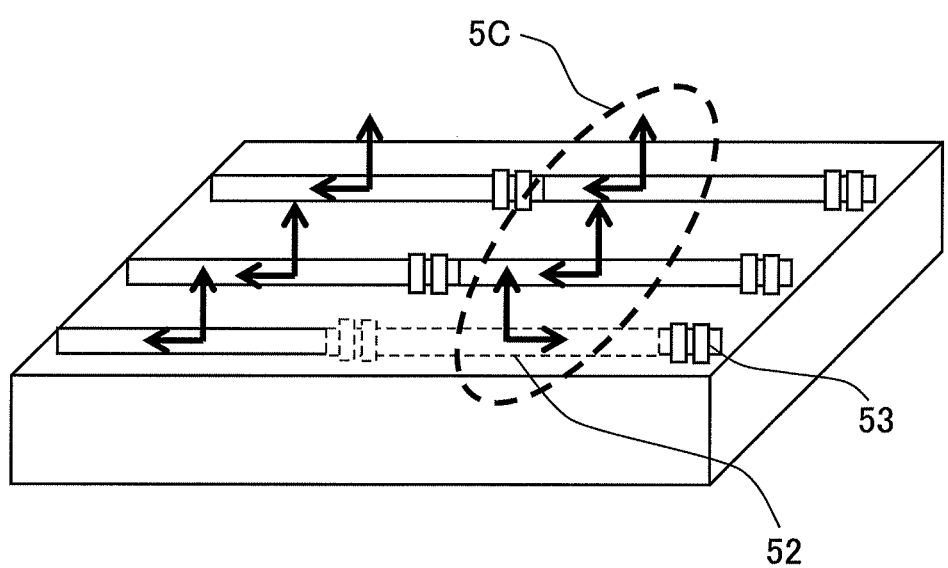
FIG. 6 is a view showing an example of placement of a workpiece.

FIG. 6 shows an example of the state of placement of workpieces 5. In this case, the position/posture of one workpiece 52 is mistakenly recognized. For this reason, if excluding the measurement data at the vicinity of the mistakenly recognized workpiece 52, the workpiece 53 ends up no longer being able to be recognized.

Therefore, the range shown by the broken line 5C is designated in advance. It is sufficient to not exclude the measurement data 60 when the position/posture of the workpiece 5 included in that range is calculated.

In one embodiment, it is possible to calculate a score representing the credibility of the position/posture of the workpiece 5 calculated by the workpiece position/posture calculation part 64 and, when the score is low (when the credibility is low), to not exclude the measurement data 60.

Figure 7:
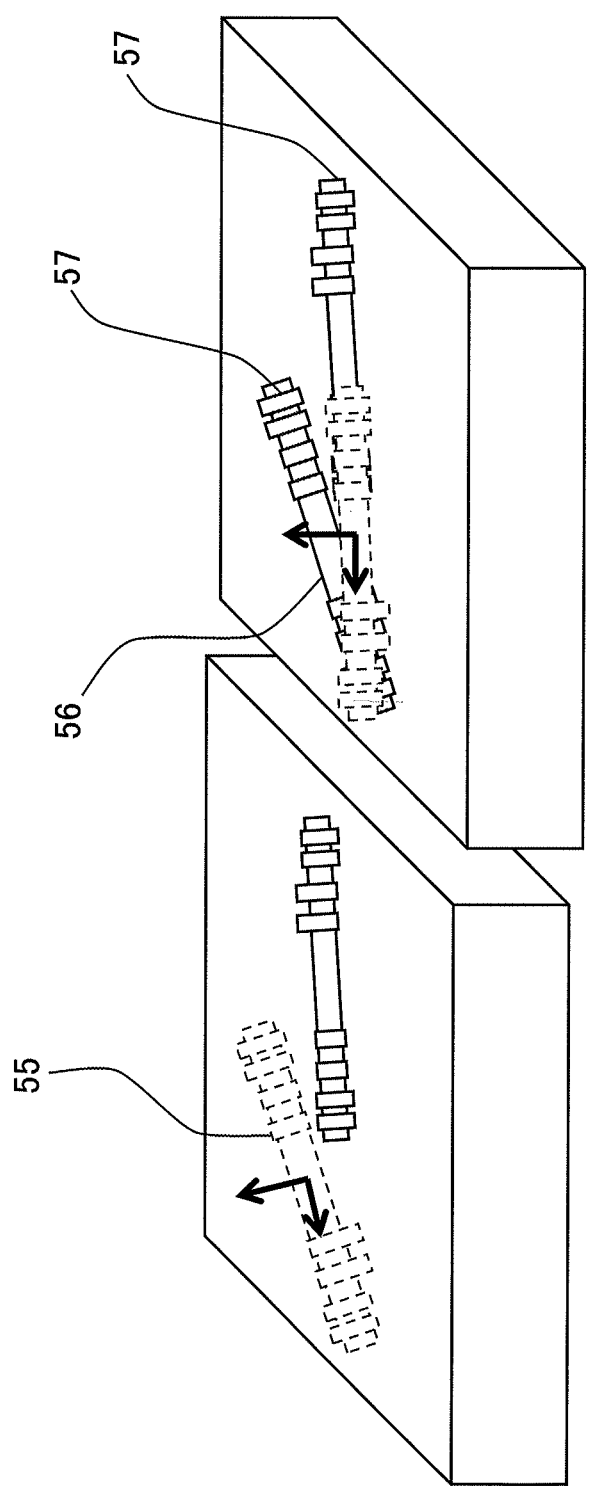
FIG. 7 is a view for explaining the credibility of a position/posture of a workpiece.

FIG. 7 shows the case where the score representing the credibility is high and the case where the score is low in comparison. Even if excluding measurement data 60 near a workpiece 55 at a position/posture corresponding to a high score, it can be guessed that there would be no effect on calculation of the position/posture of other workpieces.

On the other hand, if excluding the measurement data 60 near a workpiece 56 in a position/posture corresponding to the low score, other workpieces 57, 57 are liable to be unable to be recognized. Therefore, if a low score is given to the position/posture of a certain workpiece 5, the measurement data 60 near that workpiece 5 is not excluded. The threshold value to be compared with the score when judging whether to exclude the measurement data 60 may be included in the position/posture calculation data 63.

Figure 2:
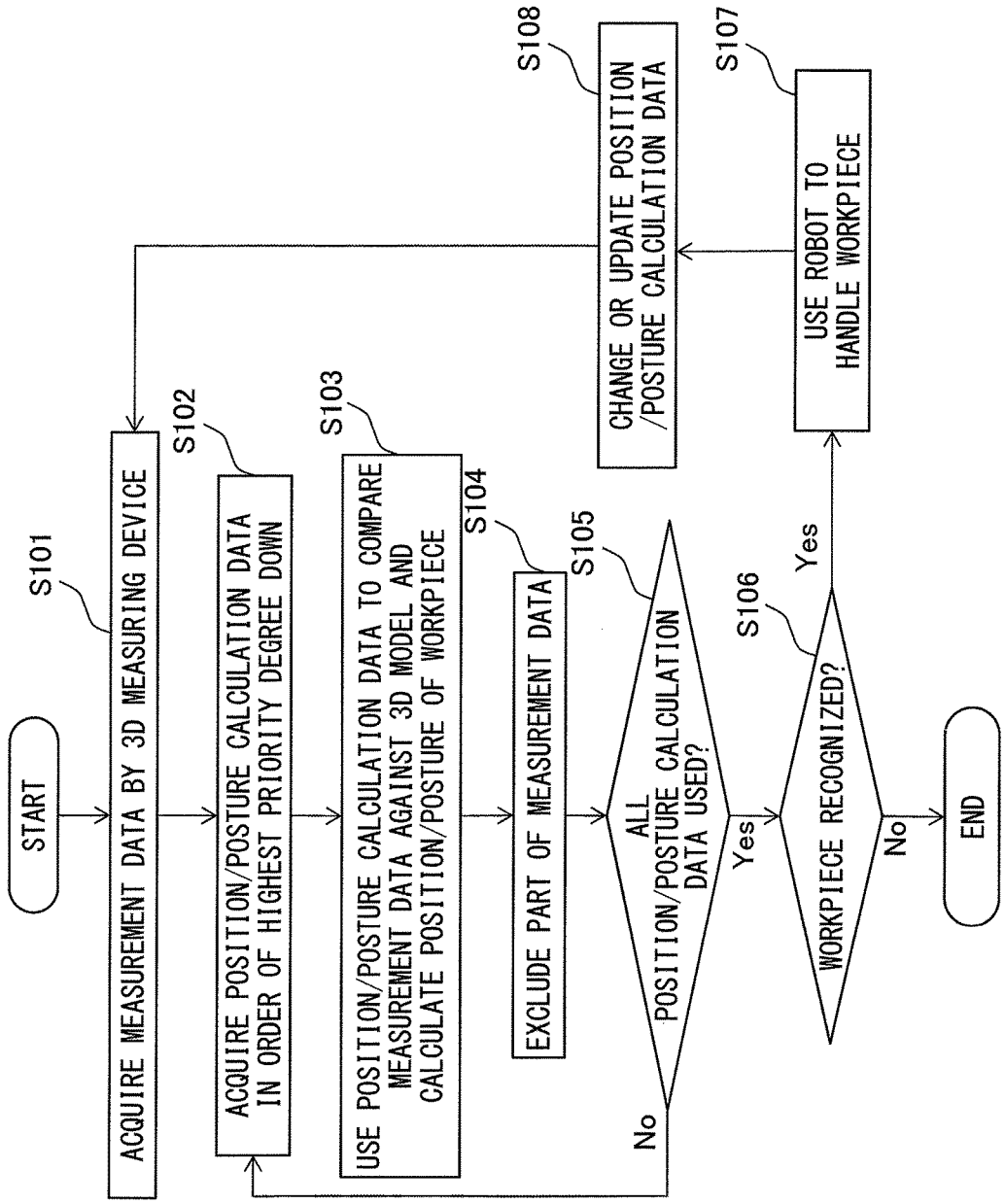
FIG. 2 is a flow chart explaining handling processing performed by a handling system according to the embodiment of FIG. 1.

FIG. 2 is a flow chart explaining the handling processing performed in the handling system 10 according to the present embodiment. The processing of FIG. 2 is for example started in response to operation of a switch by the operator. At step S101, the 3D measuring device 4 acquires measurement data 60 of the bulk stacked workpieces 5. The measurement data 60 includes 3D positions of a plurality of points on the surfaces of the workpieces 5.

At step S102, the position/posture calculation data preparation part 62 acquires the position/posture calculation data 63 in the order of the highest priority degree down.

At step S103, the workpiece position/posture calculation part 64 compares the measurement data 60 against the 3D model of the workpiece 5 and calculates the position/posture of the workpiece 5 based on the position/posture calculation data 63.

At step S104, the measurement data excluding part 65 excludes the part of the measurement data 60 based on the position/posture of the workpiece 5 calculated at step S103.

At step S105, it is judged if the step of calculating the position/posture of the workpiece 5 utilizing all of the position/posture calculation data 63 has been performed. If unused position/posture calculation data 63 remains, the routine returns to step S102.

On the other hand, if it is judged that all of the position/posture calculation data 63 has been used, the routine proceeds to step S106. At step S106, it is judged if a workpiece 5 has been recognized. If a workpiece 5 has not been recognized, it can be guessed that all of the workpieces 5 have been handled, so the handling processing is ended. On the other hand, when at least one workpiece 5 is recognized, the routine proceeds to step S107.

At step S107, the robot 2 and gripper 21 are controlled so as to handle a workpiece 5 in accordance with the position/posture of the workpiece 5 found at step S103. That is, the robot 2 is positioned at the position/posture that enables the gripper 21 to hold the workpiece 5, then the gripper 21 is operated to hold the workpiece 5.

In another embodiment, the robot 2 may be controlled so that the gripper 21 becomes a predetermined relative positional relationship with the position/posture of the workpiece 5. In this case, the relative positional relationship between the workpiece 5 at any position/posture able to serve as a reference and the position/posture of the robot 2 that is able to hold the workpiece 5 is found in advance and stored in the robot controller 3. Further, when performing step S107, the robot 2 is controlled so that the gripper 21 satisfies a predetermined relative positional relationship with respect to the workpiece 5.

Next, at step S108, for the next performed position/posture calculation step of a workpiece 5, the position/posture calculation data 63 is changed and updated.

In one embodiment, the probability of occurrence of a workpiece 5 at a certain position/posture is estimated based on statistical data of the results of calculation of the position/posture of the workpiece 5 and the priority degree, range of position, and range of posture included in the already stored position/posture calculation data 63 are updated.

Figure 8A:
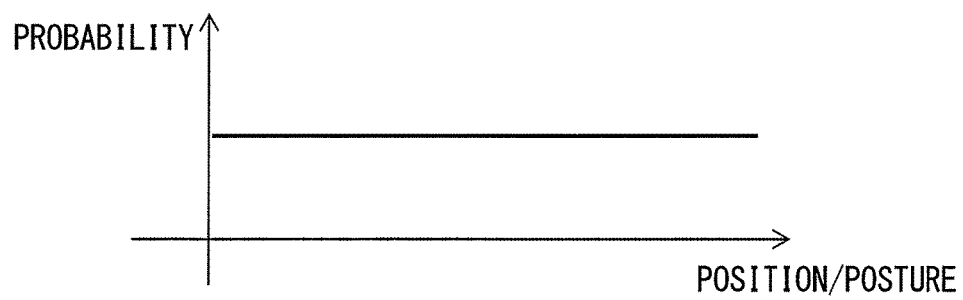
FIG. 8A is a view for explaining processing for changing a probability of occurrence of a position/posture of a workpiece.
Figure 8B:
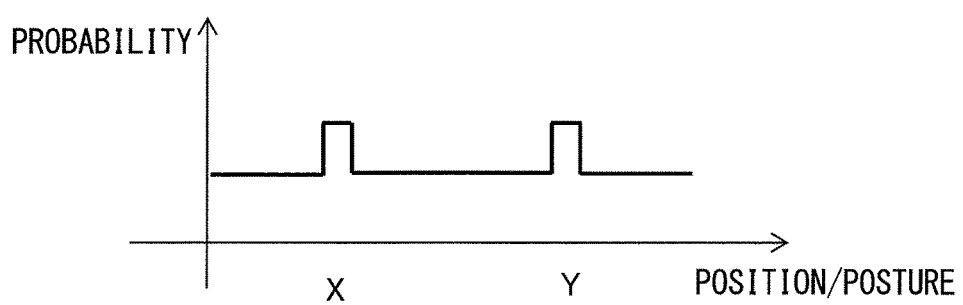
FIG. 8B is a view for explaining processing for changing a probability of occurrence of a position/posture of a workpiece.
Figure 8C:
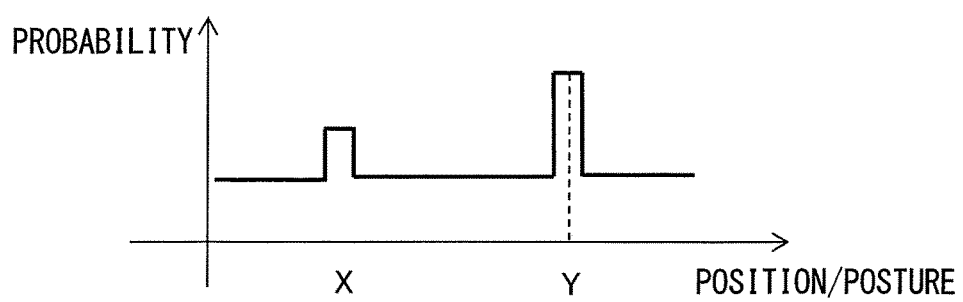
FIG. 8C is a view for explaining processing for changing a probability of occurrence of a position/posture of a workpiece.

Referring to FIG. 8A to FIG. 8C, the method of changing the probability of occurrence of a workpiece 5 at any position/posture will be explained. The abscissas of FIG. 8A to FIG. 8C represent the positions/postures of workpieces 5, while the ordinates represent the corresponding probabilities of occurrence.

FIG. 8A represents the state before changing the position/posture calculation data 63. The probability of occurrence of the workpiece 5 is constant at all positions/postures. FIG. 8B shows the case where the probabilities of occurrence of a workpiece 5 at the position/posture X and a workpiece 5 at the position/posture Y are relatively high. Here, if the workpiece 5 at the position/posture Y is newly calculated, the probability of occurrence of the position/posture Y is made to increase (see FIG. 8C). Further, the priority degree is changed so that the higher the probability of occurrence of the position/posture, the higher the priority degree of the range of search.

Figure 8D:
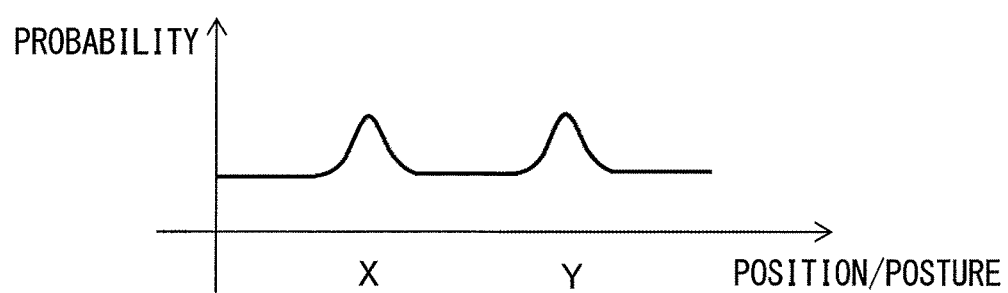
FIG. 8D is a view for explaining processing for changing a probability of occurrence of a position/posture of a workpiece.
Figure 8E:
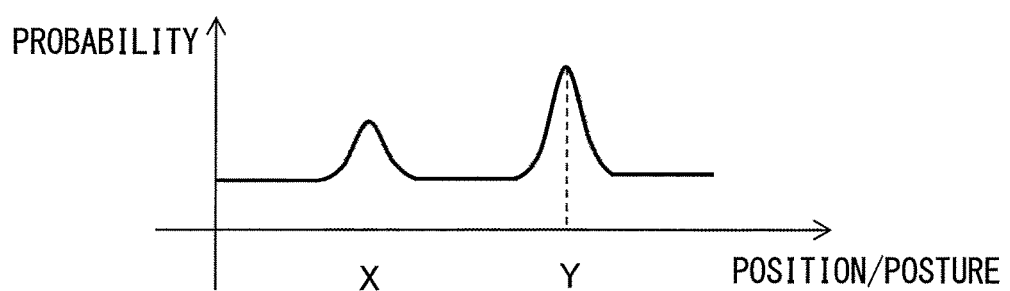
FIG. 8E is a view for explaining processing for changing a probability of occurrence of a position/posture of a workpiece.

In one embodiment, as shown in FIG. 8B and FIG. 8C, it is also possible to change the probability of occurrence so as to increase the probability of occurrence of all ranges of posture included in a predetermined range from a certain position/posture by a certain value. In another embodiment, as shown in FIG. 8D and FIG. 8E, it is also possible to change the probability of occurrence for weighting centered on the calculated position/posture.

Figure 9:
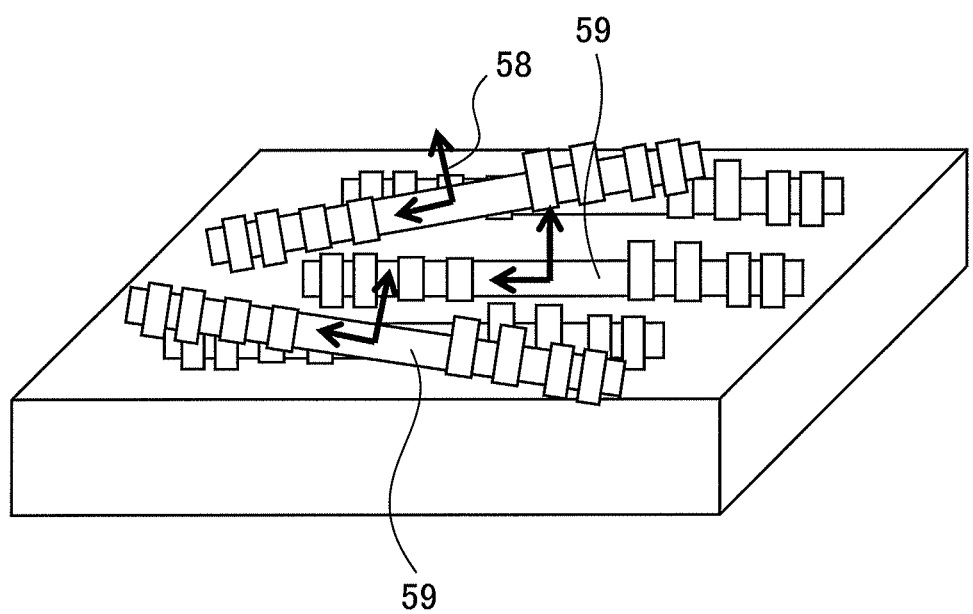
FIG. 9 is a view for explaining addition of position/posture calculation data.

In still another embodiment, at step S108, a plurality of sets of position/posture calculation data 63 may be newly added based on the results of calculation of the position/posture of the workpiece 5. The mode of addition of the position/posture calculation data 63 will be explained with reference to FIG. 9.

At step S103, it is assumed that the positions/postures of the workpieces 58, 59, and 59 are respectively calculated and, at step S107, the workpiece 58 is handled by the robot 2. In this case, as a result of the workpiece 58 being handled, it is considered the possibility of the positions/postures of the remaining workpieces 59, 59 greatly changing is low.

Therefore, the position/posture calculation data 63 determining the range of position and range of posture so that the vicinity of the already calculated position/posture of the workpieces 59, 59 is the range of search is newly prepared and stored in the workpiece position/posture calculation system 6.

At this time, the priority degree of the newly prepared position/posture calculation data 63 is set to become higher than the priority degree of the position/posture calculation data 63 stored up to then.

According to the above-mentioned handling system 10, it is possible to obtain the following advantageous effects:

(1) Position/posture calculation data 63 is stored in advance together with priorities. The position/posture calculation data 63 is used in the order from the highest priority degree down to calculate the position/posture of a workpiece 5. The result is that a workpiece 5 at a position/posture with a high probability of occurrence is searched for on a priority basis, so the time required for calculation of the position/posture of the workpiece 5 is shortened.

(2) The range of position and range of posture corresponding to a position/posture with a low probability of occurrence are also stored as position/posture calculation data 63. Due to this, it is possible to prevent a workpiece 5 from no longer being recognized despite there actually being a workpiece 5 present.

(3) Once the position/posture of the workpiece 5 is calculated, the 3D points positioned at the surface of that workpiece 5 are excluded from the measurement data. Due to this, in the next and following position/posture calculation step, it is possible to prevent a mistaken position/posture from being calculated. Further, the time required for calculation of the position/posture of a workpiece 5 can be shortened.

(4) The operator designates the ranges so that 3D points are no longer excluded from the measurement data based on the position/posture of the workpiece 5 calculated by the workpiece position/posture calculation part 64. Due to this, required measurement data 60 is no longer excluded due to the position/posture of an easily mistakenly recognized workpiece 5 and the reliability of the function for calculation of the position/posture of the workpiece 5 can be improved.

(5) If the position/posture of a workpiece 5 calculated by the workpiece position/posture calculation part 64 is not accurate, the measurement data 60 ends up being mistakenly excluded and sometimes an actually present workpiece 5 can no longer be detected. However, according to the handling system 10 according to the above-mentioned embodiment, the score representing the credibility of the calculated position/posture of the workpiece 5 is calculated, so it is possible to exclude measurement data 60 only for a high credibility position/posture. Therefore, it is possible to prevent measurement data 60 from being mistakenly excluded and possible to prevent an actually present workpiece 5 from being unable to be detected.

(6) According to an embodiment utilizing physical simulation or statistical data, the range of position and range of posture corresponding to the position/posture of the workpiece 5 with a high probability of occurrence becomes more accurately found. By limiting the search range to the range of position and range of posture with a high reliability, the time required for calculating the position/posture of the workpiece 5 is shortened.

(7) Position/posture calculation data 63 having a higher priority degree than the previously stored position/posture calculation data 63 is newly prepared based on the position/posture of a workpiece 5 calculated by the workpiece position/posture calculation part 64. Due to this, it is possible to limit the range of position and range of posture when calculating the position/posture of a workpiece 5 not handled by the robot 2 despite the position/posture of the workpiece 5 being calculated and possible to shorten the required time.

While an embodiment for handling bulk stacked workpieces was explained, the robot handling system according to the present invention may also be used for handling workpieces stacked in layers. In this case, even when several workpieces are moved from predetermined positions, in the robot handling system according to the present invention, it is possible to detect workpieces at any positions/postures, so the workpieces can be handled.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art. According to the workpiece position/posture calculation system according to the present invention, part of the measurement data utilized for 3D matching is excluded based on the position and posture of a workpiece calculated by the position/posture calculation system. Due to this, the range of search when performing 3D matching is limited and the position and posture of a workpiece can be efficiently calculated.

What is claimed is:

1. A workpiece position/posture calculation system for calculating a position and posture of a workpiece, the workpiece position/posture calculation system comprising
    a 3D measuring device measuring at least one workpiece arranged in a 3D space and acquiring measurement data including 3D position information of the at least one workpiece,
    a 3D model storage part storing a 3D model of the workpiece,
    a position/posture calculation data preparation part preparing at least one set of position/posture calculation data to be used when calculating the position and posture of the workpiece,
    a workpiece position/posture calculation part using the individual position/posture calculation data to compare the measurement data against the 3D model to calculate the position and posture of the workpiece,
    and
    a measurement data excluding part excluding part of the measurement data to be used in subsequent calculation by the workpiece position/posture calculation part based on the position and posture of the workpiece calculated by the workpiece position/posture calculation part.

2. The workpiece position/posture calculation system according to claim 1, wherein
    the position/posture calculation data includes a priority degree and
    the workpiece position/posture calculation part is configured to successively use sets of position/posture calculation data having high priority degrees to compare the measurement data against the 3D model to calculate the position and posture of the workpiece.

3. The workpiece position/posture calculation system according to claim 1, wherein the position/posture calculation data includes a range of posture to be searched when comparing the measurement data against the 3D model.

4. The workpiece position/posture calculation system according to claim 1, wherein the position/posture calculation data includes a range of position to be searched when comparing the measurement data against the 3D model.

5. The workpiece position/posture calculation system according to claim 1, wherein the position/posture calculation data further includes information relating to the measurement data which should not be excluded by the measurement data excluding part.

6. A workpiece position/posture calculation system for calculating a position and posture of a workpiece, the workpiece position/posture calculation system comprising
    a 3D measuring device measuring at least one workpiece arranged in a 3D space and acquiring measurement data including 3D position information of the at least one workpiece,
    a 3D model storage part storing a 3D model of the workpiece,
    a position/posture calculation data preparation part preparing at least one set of position/posture calculation data to be used when calculating the position and posture of the workpiece,
    a workpiece position/posture calculation part using the individual position/posture calculation data to compare the measurement data against the 3D model to calculate the position and posture of the workpiece,
    and a measurement data excluding part excluding part of the measurement data to be used in subsequent calculation by the workpiece position/posture calculation part based on the position and posture of the workpiece calculated by the workpiece position/posture calculation part, wherein the workpiece position/posture calculation part is configured to calculate the position and posture of the workpiece and calculate a score showing credibility of the results of calculation, the position/posture calculation data includes a score threshold value used when judging whether to exclude part of the measurement data based on the position/posture of the workpiece calculated by the workpiece position/posture calculation part, and the measurement data excluding part is configured to exclude the part of the measurement data when the score exceeds the score threshold value.

7. The workpiece position/posture calculation system according to claim 1, wherein the measurement data excluding part is configured to use the position and posture of the workpiece calculated by the workpiece position/posture calculation part to convert the coordinates of the 3D model and exclude the measurement data present near the 3D model converted in coordinates.

8. The workpiece position/posture calculation system according to claim 1, wherein the position/posture calculation data preparation part is configured to respond to manual input and prepare the position/posture calculation data.

9. The workpiece position/posture calculation system according to claim 1, wherein the position/posture calculation data includes a probability of occurrence of the position and posture of the workpiece estimated utilizing physical simulation.

10. The workpiece position/posture calculation system according to claim 1, wherein the position/posture calculation data includes a probability of occurrence of the position and posture of the workpiece estimated based on statistical data.

11. The workpiece position/posture calculation system according to claim 1, wherein the position/posture calculation data preparation part is configured to prepare additional sets of position/posture calculation data based on the previous results of calculation by the workpiece position/posture calculation part.

12. A handling system handling a workpiece by a robot, the handling system comprising:
a robot which is able to handle a workpiece, and
a workpiece position/posture calculation system for calculating a position and posture of a workpiece, the workpiece position/posture calculation system comprising:
 (i) a 3D measuring device measuring at least one workpiece arranged in a 3D space and acquiring measurement data including 3D position information of the at least one workpiece,
 (ii) a 3D model storage part storing a 3D model of the workpiece,
 (iii) a position/posture calculation data preparation part preparing at least one set of position/posture calculation data to be used when calculating the position and posture of the workpiece,
 (iv) a workpiece position/posture calculation part using the individual position/posture calculation data to compare the measurement data against the 3D model to calculate the position and posture of the workpiece, and
 (v) a measurement data excluding part excluding part of the measurement data to be used in subsequent calculation by the workpiece position/posture calculation part based on the position and posture of the workpiece calculated by the workpiece position/posture calculation part,
wherein the handling system is configured so that the robot handles the workpiece based on the position and posture of the workpiece calculated by the workpiece position/posture calculation system.

13. A handling system comprising
a robot which is able to handle a workpiece, and
a workpiece position/posture calculation system for calculating a position and posture of a workpiece, the workpiece position/posture calculation system comprising:
 (i) a 3D measuring device measuring at least one workpiece arranged in a 3D space and acquiring measurement data including 3D position information of the at least one workpiece,
 (ii) a 3D model storage part storing a 3D model of the workpiece,
 (iii) a position/posture calculation data preparation part preparing at least one set of position/posture calculation data to be used when calculating the position and posture of the workpiece,
 (iv) a workpiece position/posture calculation part using the individual position/posture calculation data to compare the measurement data against the 3D model to calculate the position and posture of the workpiece, and
 (v) a measurement data excluding part excluding part of the measurement data to be used in subsequent calculation by the workpiece position/posture calculation part based on the position and posture of the workpiece calculated by the workpiece position/posture calculation part,
 wherein the position/posture calculation data preparation part is configured to prepare additional sets of position/posture calculation data based on the previous results of calculation by the workpiece position/posture calculation part,
which handling system
is configured so that the robot handles the workpiece based on the position and posture of the workpiece calculated by the workpiece position/posture calculation system and
is configured so that the position/posture calculation data preparation part prepares additional sets of position/posture calculation data based on the position and posture of at least one of the workpieces other than the workpiece handled by the robot among the positions and postures of the workpieces calculated by a workpiece position/posture calculation part.

* * * * *